United States Patent [19]

Kovács

[11] Patent Number: 4,566,341

[45] Date of Patent: Jan. 28, 1986

[54] ELECTROMECHANICAL MEASURING CONVERTER PIN

[75] Inventor: Sándor Kovács, Budapest, Hungary

[73] Assignee: Vasipari Kutato es Fejleszto Vallalat, Budapest, Hungary

[21] Appl. No.: 605,638

[22] Filed: Apr. 30, 1984

[30] Foreign Application Priority Data

Apr. 29, 1983 [HU] Hungary ............................ 1473/83

[51] Int. Cl.⁴ .............................................. G01L 1/22
[52] U.S. Cl. ............................. 73/862.65; 73/862.48; 73/862.56
[58] Field of Search ........... 73/862.44, 862.48, 862.54, 73/862.56, 862.65, 862.66; 177/211

[56] References Cited

U.S. PATENT DOCUMENTS

| | | | |
|---|---|---|---|
| 3,754,610 | 8/1973 | Paelian et al. | 177/211 |
| 3,992,934 | 11/1976 | Clark | 73/862.54 |
| 4,454,769 | 6/1984 | Loos | 73/862.65 X |

FOREIGN PATENT DOCUMENTS

| | | | |
|---|---|---|---|
| 2631698 | 7/1977 | Fed. Rep. of Germany | 73/862.66 |
| 2802947 | 7/1978 | Fed. Rep. of Germany | 73/862.56 |
| 1577341 | 10/1980 | United Kingdom | 73/862.66 |

Primary Examiner—Charles A. Ruehl
Attorney, Agent, or Firm—Handal & Morofsky

[57] ABSTRACT

An electromechanical measuring converter pin, particularly for measuring forces having varying influence lines, the pin has a pair of two opposite cylindrical and flat surfaces (2,3). The points or lines of application of the force and reaction force (4,5) are on the cylindrical surfaces (3). Recesses (7,8) are machined along the full length of both flat surfaces parallel with and extending over the geometric axis (6) of the pin, the walls of the recesses are parallel with each other and, at least two deformation sensors (9,10,11,12) connected to a measuring bridge (13) are arranged on the flat surfaces opposite the respective recesses starting from the given flat surface (2).

6 Claims, 12 Drawing Figures

ELECTROMECHANICAL MEASURING CONVERTER PIN

FIELD AND BACKGROUND OF THE INVENTION

Subject of the invention is an electromechanical measuring converter pin, particularly for measuring force of varying influence line.

The most frequently measured quantity in the industrial practice is the force. Along the propagation of the electrical measuring methods several solutions have been worked out for the conversion of force to electric signal. The strain gauge type measuring converters are recently the most frequently used for this purpose, which however utilize other physical phenomena as well. In these electromechanical measuring converters the correct conversion of the force to electric signal requires the coincidence of the influence line of the force to be measured and the measuring direction of the converter. In every other case additional stresses are produced in the measuring body in the wake of the additional load. While the force applied on the measuring body is a single force, the measuring converter produces from this resultant force an electric signal proportionate to the component in the measuring direction. If moment too arises as resultant, then the converter measures component corresponding to force even from this moment.

Consequently careful attention is paid in the practice to the correct introduction of the force. Special structural elements are provided for taking up the force perpendicularly to the measuring direction in order to prevent its effect on the measuring body of the converter, i.e. to prevent the development of forces deviating from the measuring direction. The problem was solved with the development of the holder type force meter. Later measuring shaft or pin type converters were used for this purpose. In spite of this diversified construction, in addition to the absolute value of the force to be measured its influence line too will inevitably vary in the several measuring tasks.

Each measuring converter used so far produces electric signal proportionate only to the component in the measuring direction. Such is for example the construction according to the Soviet patent specification No. 198 735. Actually this is a holder, supported on both ends. Between these two supports two truncated cones are arranged with their large diameter bases turned against each other. The double cone is loaded by concentric force along the large diameter part from the cylindrical bush. Thus this holder is exposed to bending load. The load can be increased until the generatrices of the cones will be parallel with the generatrix of the bush, i.e. when they bear upon each other.

Similar pin type force meter is described in the Swedish Pat. No. 311 573 or U.S. Pat. No. 3,554,025.

The measuring body is a holder clamped on both ends, and a moment and a force are applied to one of the ends. The moment too is produced by the force to be measured. The build-up of the measuring bridge is such that it is insensitive to the lateral force, i.e. it measures only the force in the direction of the vertical axis (coinciding with the force to be measured) of the sectional area of the measuring body. Consequently for the correct operation of the measuring converter the orientation of the converter in relation to the force to be measured is essential (e.g. during the measurement of funicular forces).

According to another method (GFR Pat. No. 24 35322) the force to be measured and the reaction force are applied as a couple of forces to both ends of the tubular shaft, thus the tubular shaft holder is exposed to permanent moment between the two intermediate positions of the force transfer. The measuring sensors however are arranged on the two ends of varying moment along the plane of the neutral strand at ±45° to the direction of the shear stresses.

This way the measuring converter allows the measuring of the force component perpendicular to the neutral plane of the tubular shaft.

Similarly a couple of forces is formed on both ends of the holder by the measuring converter according to the GFR patent specification No. 2 631 698. In each of the different sectional areas the deformation sensor is arranged on the tangential surface perpendicular to the neutral plane, the measuring direction pointing to the direction of the tensile or compressive stresses produced by the shear stresses.

An interesting method is described in the GFR disclosure No. 2 650 442. According to this method one of the two perpendicular components of the force arising in the machine unit—bar, cylinder, etc.—along a straight line connecting two hinges in the mechanism of the power machines, such as elevator. The measuring body is trunnion-shaped and multisupported (three) holder, and each support may be conceived as a clamp. The two extreme clamps represent for example the reaction force, and the intermediate one represents the force to be measured. The neutral axis of the sectional area of the bent bar coincides with the direction of the component not to be measured, while the direction of the axis perpendicular to the former one is the direction of the measuring axis.

The measuring trunnion described in the Hungarian patent application No. VA-1538 realizes also the measuring of a unidirectional force. If the influence line of the force deviates from the line perpendicular to the plane determined by the longitudinal axis of the torsional parts of the measuring body, then the converter will measure the force component in the direction of the perpendicular line.

In the Soviet copyright certificate No. 140 593 such measuring trunnion is described, which allows the determination of the force applied to the shaft of the mechanisms. The measuring converter is a holder supported on both ends and loades in the centre. The load produced by the force to be measured is sensed in the direction of two axes perpendicular to each other and to the longitudinal axis of the holder, thus the force to be measured is divided into two components. According to the described method grooves are formed along the length of the cylinder at the two diameters of the sectional area, where the deformation sensors are arranged on the bottom of the surfaces.

The moment as the product of the force components and the spans produce the output signals of the measuring bridges.

The actual force is obtained by squared addition and square root extraction, its direction in relation to the two axes is obtained with arc tg function calculation.

SUMMARY OF THE INVENTION

The present invention is aimed at the realization of such measuring converter pin which enables the measurement of the absolute value of the force applied to the pin even if the direction of the influence line of the force to be measured varies.

The problem is solved according to the invention in that the measuring converter pin has a pair of two opposite cylindrical and flat surfaces, where the points of application of the force and the reaction force are on the cylindrical surfaces, and recesses are machined along the full length of both flat surfaces parallel with and extending over the geometrical axis of the pin, the walls of the recesses are parallel with each other and at least two deformation sensors connected to measuring bridge are arranged on each flat surface opposite the recesses starting from the other flat surface, and below the recesses starting from the given flat surface.

The recesses may be symmetrically or asymmetrically arranged in relation to the geometrical axis of the pin. In both cases it is possible that the recesses are perpendicular or at angle to the influence line of the force and reaction force. The bottom part of the recesses is suitably rounded to prevent peak stresses developing at the corners.

The invention is based on the recognition that the most frequently used element of the mechanical practice is the pin, which in a simple case ensures the flow path of the force between two or several machine parts with shear stress, it is provided with suitable recesses and instead of the simple shear stress ensures such stress distribution which is suitable for measuring the absolute value of the forces with influence line of varying direction.

BRIEF DESCRIPTION OF THE DRAWINGS

Further details of the invention are described by way of examples with the aid of drawing, in which.

DESCRIPTION OF THE PREFERRED EMBODIMENTS

Figures 1, 1A, 1B, 2:
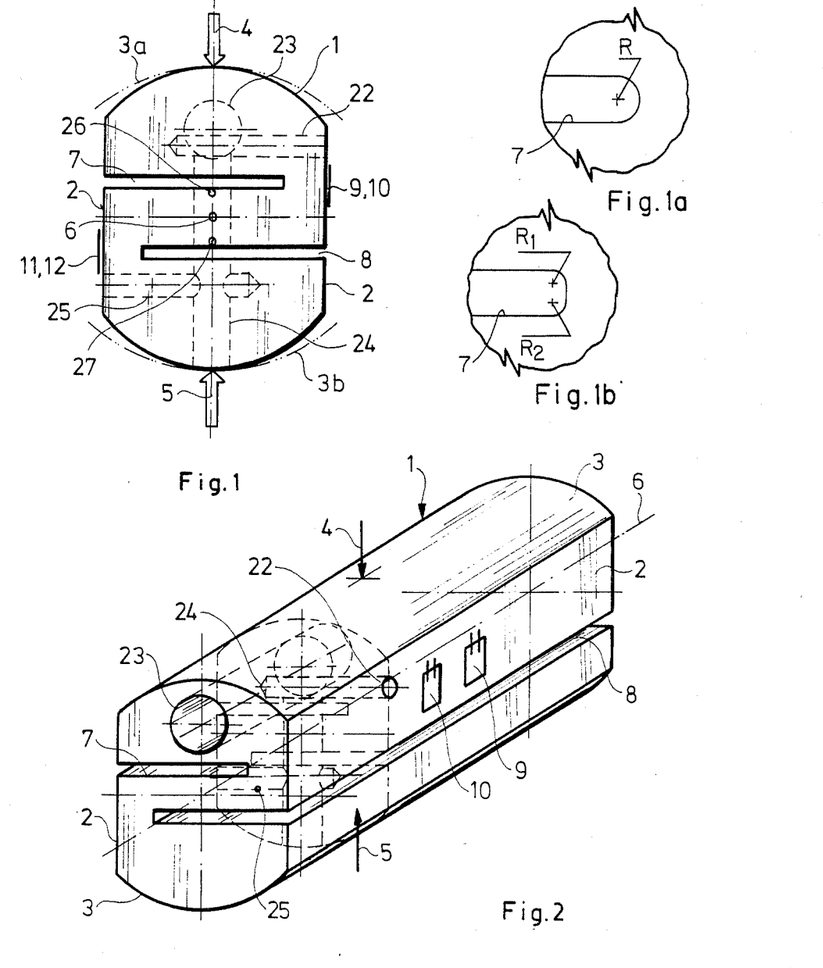
FIG. 1: Front view of the measuring pin to the invention
FIGS. 1a and 1b show the rounded formation of the bottom or far end of the recesses in a broken-out fashion.
FIG. 2: Perspective view of the measuring pin shown in FIG. 1
Figures 3, 4:
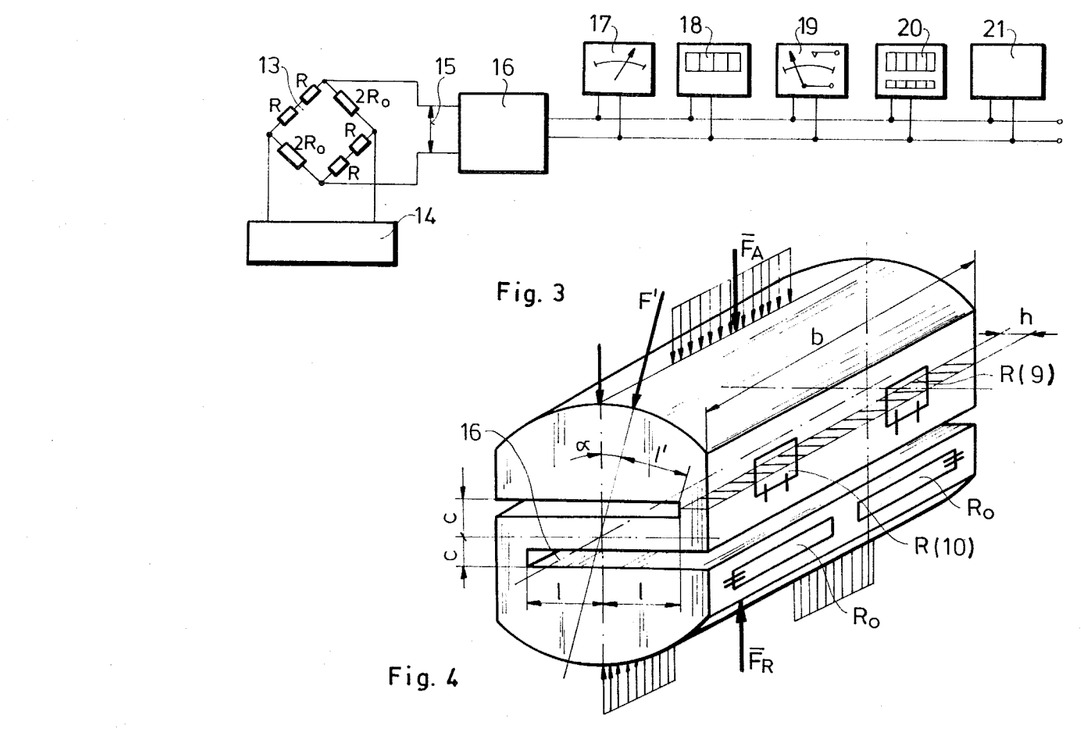
FIG. 3: Diagram of the measuring arrangement corresponding to the method shown in FIGS. 1 and 2
FIG. 4: Selection of the geometric dimensions of the measuring pin

FIGS. 1–3 show a pin 1 surrounded by flat surfaces 2 and cylindrical surface 3. The cylindrical surfaces 3 of the pin 1 are exposed to forces 4 and 5. The flat surfaces are parallel to the plane formed by forces 4 and 5 and by the geometric axis 6 of the pin 1.

The pin 1 is provided with recesses 7 and 8 on both sides. The plane of the recesses 7 and 8 arranged parallel with the plane of the geometric axis 6.

Deformation sensors 9,10 and 11,12 are arranged on the flat surfaces 2 opposite the recesses 7 and 8 respectively.

The deformation sensors 9–12 are strain gauges of resistance R, which are arranged in the circuit of the measuring bridge 13 shown in FIG. 3, and in this case they emit output signal ($U_{out}$) 15 proportionate to the force 4 and 5 when connected to the supply unit 14. In given case this can be transmitted to analogue 17 and/or digital indicator unit 18 with the intermediation of data processing unit 16. In case of necessity the system can be supplemented with limit value sensor 19 and wth switching or preselector feeding unit 20. The system may include optional microprocessing control unit 21 as well. The system is suitable for conducting measurements from the simple force measuring up to the most complex balance-technical problems through the complex safety indicators and switching devices. Arrangement of the wiring of the measuring circuit is ensured by holes 22–25 formed in the pin 1.

Instead of concentrical cylindrical surfaces 3 the pin 1 can be formed also with cylindrical surfaces 3a and 3b provided with different centres 26, 27.

The mechanical load of the converter is bending and it can be set to the required value by the suitable selection of the geometric dimensions. Using the symbols of FIG. 4, if the resultant of the active forces is $\overline{F}_a$ and $\overline{F}_R$, then:

$$\overline{F}_A = \overline{F}_R = F \text{ force}$$

moment $M = F \times 1$ is applied to the sectional area $b \times h$, and the tensile stress arising on the surfaces 2 is:

M which is converted by the deformation sensing resistances R 9,10,11 and 12 to resistance change R. The $U_{out} = f(F)$ is valid for the given arrangement, if the common influence line of $\overline{F}_A$ and $\overline{F}_R$ deviates from the plane perpendicular to the plane 21×b, i.e. if it is not parallel with it, then the output signal appears as the cosine of the angle between the plane and the influence line:

$$U'_{out} = U_{out} \cos \alpha = f(F) \cos \alpha$$

The measuring limit of the converter—apart from the material characteristic (modulus of elasticity E)—is determined by the geometric dimensions and by the force $|\overline{F}_A| = |\overline{F}_R| = F$. Allowing stress $\delta_{perm}$ in the measuring body, the section modulus $\chi = (bh^2/6$ corresponds to the moment $M = F \times 1$, through the function of:

$$\delta_{perm} = M/\chi$$

Figure 5:
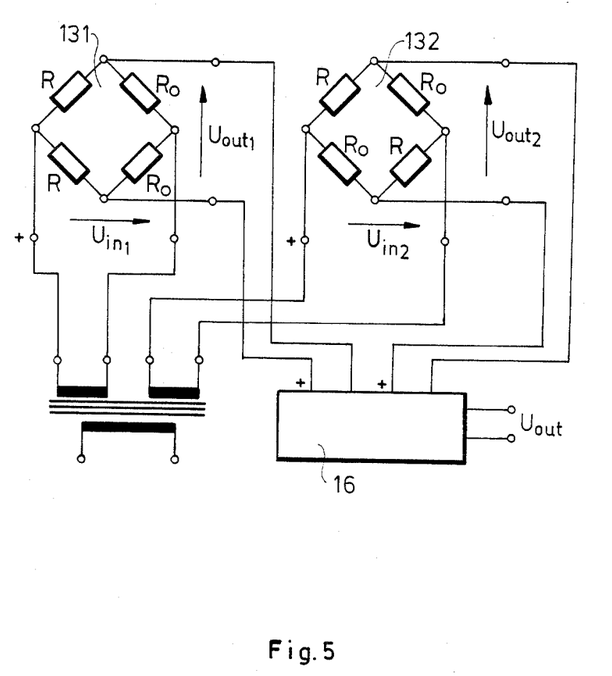
FIG. 5: Diagram of two measuring circuits

The measuring circuits 131 and 132 are built up from the resistances R 9,10 or 11,12 arranged on surface 2 of the converter and from the resistance $R_o$ arranged on the unstressed position, the signal voltage $U_{out}$ of which appearing on the output is in proportion to the force F producing the moment M. The signal of the measuring circuits 131, 132 formed by the resistances R is converted to output signal by the data processing unit 16. This is utilized according to the given task.

If the resultant F' of the distributed loads is at an angle of 90-α to the plane 21×b, then the arm of the force varies according to the following function:

$$l' = (l - c\ \text{tg}\alpha) \cos \alpha$$

i.e. it will be the function of α and thus the signal voltage $U_{out}$ as well:

$$U_{out} = f(F, \alpha)$$

The purpose of the measuring is the determination of force F. The force F can be calculated from the result of two independent measurements. The measuring circuits 131 and 132 are symmetric to the given geometric axis 6, thus—though they are independent from each other—they give the same result.

The decisive moment for the surface load 2:

$$M_1 = F(l - c\ \text{tg}\alpha) \cos \alpha$$

for surface 3:

$$M_2 = F(l - c\ \text{tg}\alpha) \cos \alpha$$

Equation of the measuring circuit:

$$\frac{U_{out}}{U_{in}} = \frac{R^2 - R_o^2}{(R + R_o)^2}$$

in the unloaded condition (F=0), and $$\frac{U_{out}}{U_{in}} = \frac{(R + \Delta R_o)^2 - R_o^2}{(R + \Delta R + R_o)^2}$$

if F≠0, i.e. ΔR=f(F). Because of the symmetry the function f(F) gives the same value for ΔR, thus $U_{out1} = U_{out2}$. This does not allow the determination of α and F.

Figure 6:
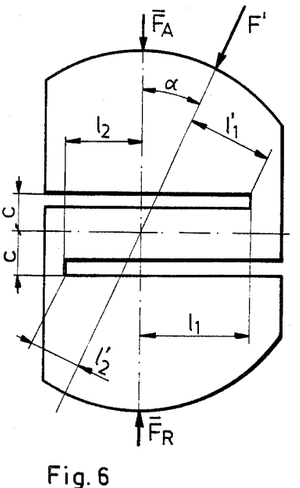
FIG. 6: Construction of the pin according to the invention where the arm of the bending produced by force applied to the pin is not identical for both sides

It is necessary to ensure the difference $M_1 \neq M_2$ by geometry. There are two possibilities available for this purpose:

a. the arms of bending are not identical for the two sides (FIG. 6), i.e., $l_1 \neq l_2$, or b. the arms of bending are identical for both sides ($l_1 = l_2 = l$), but they are arranged along asymmetric plane in relation to the centre 16 (FIG. 7), i.e. $c_1 \neq c_2$.

in case of a. (FIG. 6) $\delta_{perm}$=constant assumed for both sides:

$$\delta_{perm} = M_1/\chi_1 = M_2/\chi_2 = \text{constant}$$

i.e.

$$l_1/h_1^2 = l_2/h_2^2$$

The equation $U_{out1} = U_{out2}$ is realized with such geometric dimensions. The two measuring circuits jointly give the sum of the signals $$\Sigma U_{out} = U_{out1} + U_{out2}$$

and the signal difference:

$$\Delta U_{out} = U_{out1} - U_{out2}$$

The measuring index of force F is obtained from the sum of the signals. The signal difference $$\Delta U_{out} = 0$$

means, that the influence line of the force is perpendicular to the plane:

$$[(l_1 + l_2) \times b]$$

In case of: $U_{out} \neq 0$
the deviation of the influence line is calculated from the perpendicular line. Namely:

$$U_{out1} = k \times M_1 = kF(l_1 - c\ \text{tg}\alpha) \cos \alpha$$

and $$U_{out2} = k \times M_2 = kF(l_2 - c\ \text{tg}\alpha) \cos \alpha$$

furthermore $$\Sigma U_{out} = kF(l_1 + l_2 - 2c\ \text{tg}\alpha) \cos \alpha$$

and $$\Delta U_{out} = kF(l_1 - l_2) \cos \alpha$$

give the ratio:

$$\frac{\Sigma U_{out}}{\Delta U_{out}} = \frac{l_1 + l_2 - 2c\ tg\ \alpha}{l_1 - l_2} = \frac{l_1 + l_2}{l_1 - l_2} - \frac{2c}{l_1 - l_2} tg\alpha$$

from which $$tg\alpha = \frac{l_1 + l_2 - \frac{\Sigma U_{out}}{\Delta U_{out}}(l_1 - l_2)}{2c}$$

This way the value of F' from $\Sigma U_{out}$:

$$F = \frac{\Sigma U_{out} \sqrt{1 + tg^2}}{k(l_1 + l_2 - 2c\ tg\alpha)}$$

or from $\alpha U_{out}$:

$$F = \frac{\Delta U_{out} \sqrt{1 + tg^2 \alpha}}{k(l_1 - l_2)}$$

The suitable selection of the values $l_1$, $l_2$ and c allows the further reduction of these expressions: Thus with the selection of $l_1 = l_2 = 2c$ $$tg\alpha = \frac{l_1 - l_3}{2c} - \frac{\Sigma U_{out}}{\Delta U_{out}}$$

and $$F = \frac{U_{out} \sqrt{1 + tg^2 \alpha}}{2c\ k}$$

Figure 7:
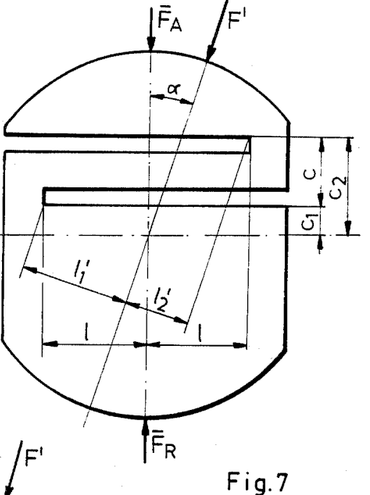
FIG. 7: Illustration of such alternative where the arm of bending is identical for both sides, but it is asymmetric to the centreline of the pin

In case of b (FIG. 7) the following can be written:
$\delta_{perm}$=constant
for both sides, and since l=constant $$M_1 = M_2 = Fl$$

$$\Sigma M = M_1 = M_2 = 2Fl$$

$$\Delta M = M_1 - M_2 = 0$$

The meaning of these two equations is identical with those described in the foregoing, i.e.:

$$\Sigma U_{out} = k\Sigma M = k^x F \rightarrow F = \Sigma U_{out}/k^x$$

$$\Delta U_{out} = 0,$$

the force F is perpendicular to the plane $21 \times b$. Should the force F' react along the influence line at angle $\alpha$ to this perpendicular line. Then the moments:

$$M_1 = F'(l + c_1 \, tg\alpha) \cos \alpha$$

and $$M_2 = F'(l - c_2 \, tg\alpha) \cos \alpha$$

Their sum and difference is obtained as follows:

$$\Sigma M = M_1 + M_2 = F'(2l - c \, tg\alpha) \cos \alpha$$

$$\Delta M = M_1 + M_2 = F'(c_1 + c_2) \, tg\alpha \cos \alpha$$

The ratio of $\Sigma M/\Delta M$ for $tg\alpha$ is:

$$\frac{\Sigma M}{\Delta M} = \frac{2l - c \, tg\alpha}{(c_1 + c_2) tg\alpha}$$

from which:

$$tg\alpha = \frac{2l}{\frac{\Sigma M}{\Delta M}(c_1 + c_2) + c}$$

thus the force:

$$F = \frac{\Delta M}{c_1 + c_2} \frac{\sqrt{1 + tg^2\alpha}}{tg\alpha}$$

Looking at the diagram and at the equations, further reductions can be obtained in case of $c=0$, $c_1=c_2$:

$$tg\alpha = \frac{\Sigma M}{\Delta M} \frac{1}{c}$$

and $$F = \frac{\Sigma M}{2l} \sqrt{1 + tg^2\alpha}$$

or $$F = \frac{\Delta M}{2c} \frac{\sqrt{1 + tg^2\alpha}}{tg\alpha}$$

Figure 8:
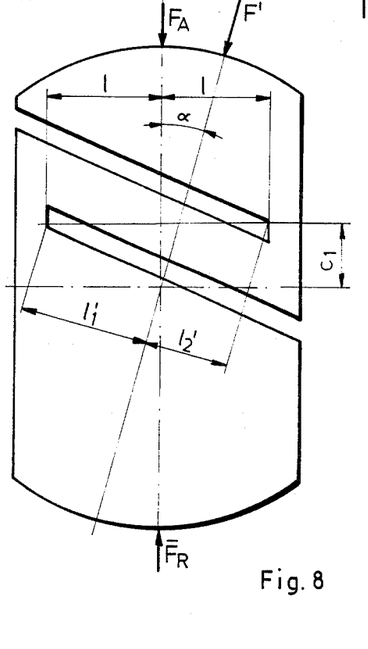
FIG. 8: Construction where the recesses are asmmetrically arranged to the centreline

This position is shown in FIG. 8. For the accurate determination of the tensiometer—in addition to the former simplified train of thought—it is necessary to consider the complex stress, i.e. that the force applied to the given sectional area $b \times h$ is a compressive force as well still with further bending stresses because of the width of the recess.

Figure 9:
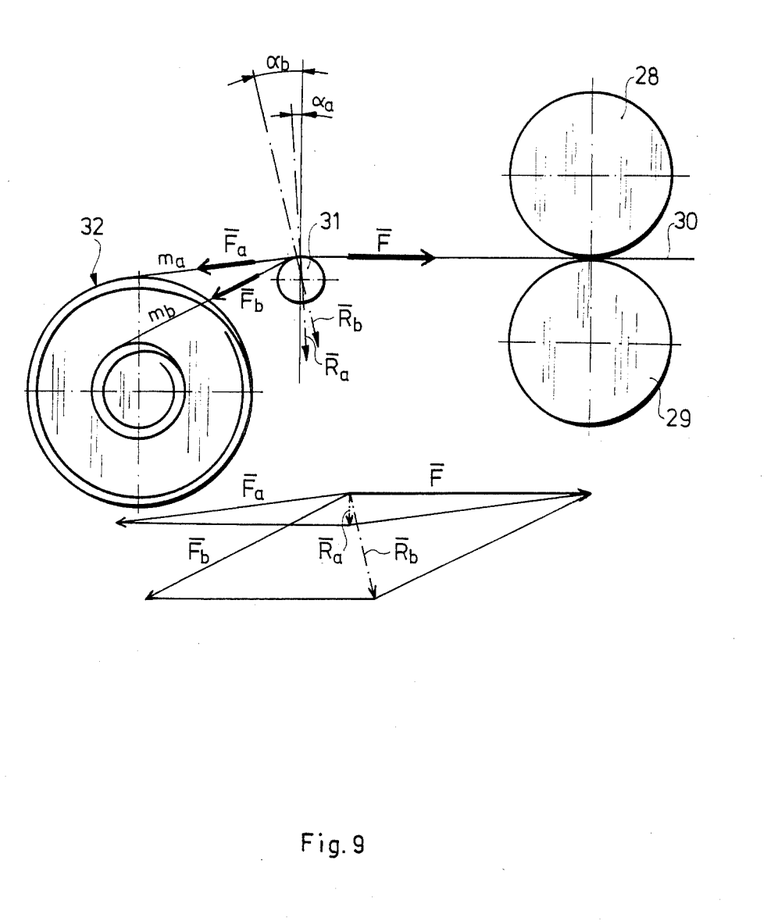
FIG. 9: Application possibility of the measuring pin according to the invention for the continuous measuring of band tensioning force during the rolling of metal bands

A characteristic mode of utilization of the presented methods is shown in FIG. 9. The problem to be solved is the continuous measurement of the tensile force F during the rolling of the metal band. The band 30 running between rolls 28 and 29 arrives through the guiding roll 31 at the winding drum 32. The quantity of the band 30 wound on the drum 32 changes continually, and the position of the components Fa, Fb . . . etc. in relation to the force component F will also vary continually. Accordingly the direction and intensity of the resultant force R will also vary. The directionally correct resultant force R can be measured for example with the measuring pin according to the invention, and thus to give suitable signal for the control of the tensile force F required for rolling.

Figure 10:
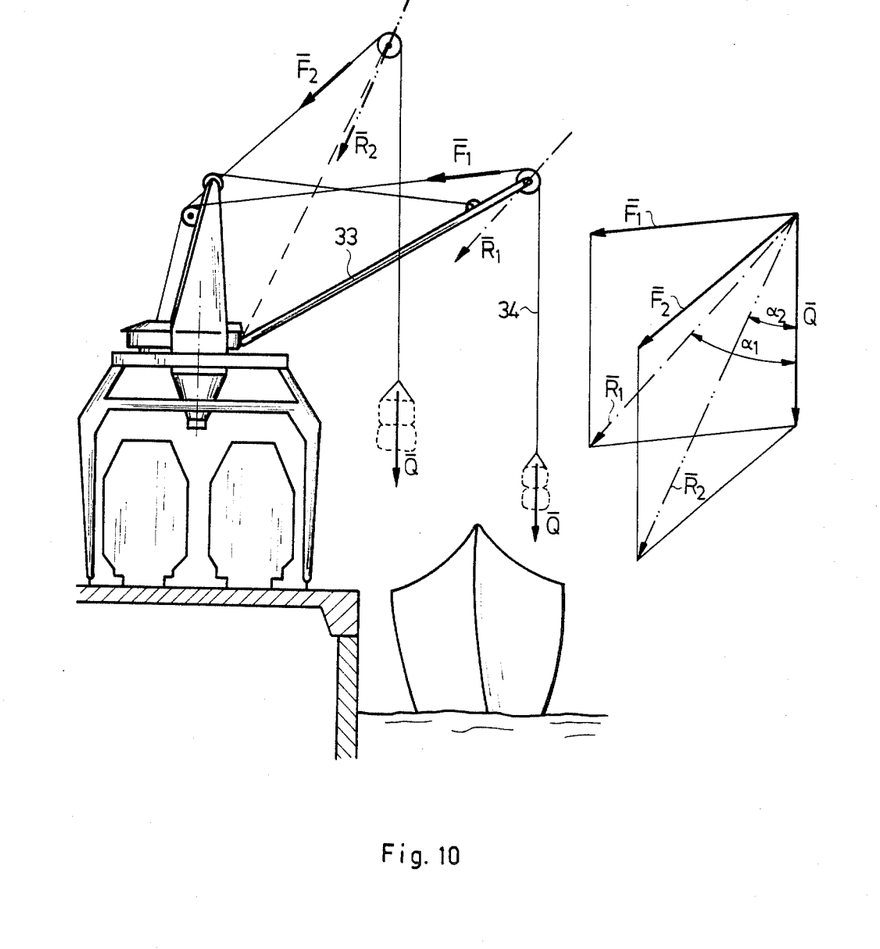
FIG. 10: Another example of application where the pin according to the invention is built into the jib of a crane.

FIG. 10 shows another example for application.

The safe work performed during operation of the port-type portal cranes, floating cranes and elevators is conditional on the moment produced by the load being lower than the tilting moment e.g. the applied force is the resultant force of the loadside strand and the strand F over the drum of the lifting rope 34 on the head of the jib 33. This force even under constant load Q changes along with the resultant force $R_2$ upon variation of the jib 33 position. Thus the continuous measuring of the force and the geometric position is required for calculation of the applied moment. This is realized by building in the pin according to the invention into the head of the jib 33.

In both cases at constancy of the force given by the technology (F or Q) changes from the resultant $R_a$ to $R_b$, and from $R_1$ to $R_2$ along with the directional change (e.g. from $\alpha_a$ to $\alpha_b$ and $\alpha_1$ to $\alpha_2$ in relation to the vertical).

In view of above it is evident that the method according to the invention is fundamentally different from the earlier ones. The axes of bending or torsion are parallel with the longitudinal axis of the measuring converter, while the sectional area can be regarded as a plane curve bar. The enclosing surface of the measuring body is such that the influence line of the force passes always through the longitudinal axis of the enclosing surface, and the destorted parts are symmetrical in relation to the axis.

Thus the measuring pin according to the invention is suitable for determination of the absolute value of the transmitted force effect, even in case of varying influence line.

Naturally the measuring pin can be developed besides the present forms in several other forms as well, and is suitable for important practical measurements.

What we claim is:

1. Electromechanical measuring converter pin, particularly for measuring force of varying influence line, characterized in that it has a pair of two opposite cylindrical and flat surfaces (2,3), where the points or lines of application of force and reaction force (4,5) are on the cylindrical surfaces (3) and recesses (7,8) are machined along the full length of both flat surfaces parallel with and extending over the geometric axis (6) of the pin (1), the walls of the recesses (7,8) are parallel with each other and at least two deformation sensors (9,10,11,12) connected to measuring bridge (13) are arranged on the flat surface and below the recesses (7,8) starting from the given flat surface (2).

2. Measuring pin as claimed in claim 1, characterized in that the recesses (7,8) are symmetrically arranged to the geometric axis (6).

3. Measuring converter pin as claimed in claim 1, characterized in that the recesses (7,8) are asmmetrically arranged to the geometric axis (6).

4. Measuring converter pin as claimed in claim 1, characterized in that the recesses (7,8) are perpendicular to the influence lines of the forces (4,5).

5. Measuring converter pin as claimed in claim 1, characterized in that the recesses (7,8) are at an angle to the influence lines of the forces (4,5).

6. Measuring converter pin as claimed in claim 1, characterized in that the bottom part of the recesses (7,8) is rounded.

* * * * *